US009560429B2

(12) United States Patent
Lord (10) Patent No.: US 9,560,429 B2
(45) Date of Patent: Jan. 31, 2017

(54) OPTICAL SWITCH (71) Applicant: BRITISH TELECOMMUNICATIONS PUBLIC LIMITED COMPANY, London (GB)

(72) Inventor: Andrew Lord, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/780,948

(22) PCT Filed: Mar. 12, 2014

(86) PCT No.: PCT/GB2014/000091
§ 371 (c)(1),
(2) Date: Sep. 28, 2015

(87) PCT Pub. No.: WO2014/155033
PCT Pub. Date: Oct. 2, 2014

(65) Prior Publication Data
US 2016/0057514 A1  Feb. 25, 2016

(30) Foreign Application Priority Data

Mar. 28, 2013 (GB) .................................. 1305801.1

(51) Int. Cl.
*H04Q 11/00* (2006.01)
*H04J 14/02* (2006.01)
(52) U.S. Cl.
CPC ....... *H04Q 11/0005* (2013.01); *H04J 14/0204* (2013.01); *H04J 14/0205* (2013.01);
(Continued)
(58) Field of Classification Search
CPC .................................................. H04Q 11/0003
See application file for complete search history.

(56) References Cited

U.S. PATENT DOCUMENTS 5,762,788 A  6/1998 Gullett
6,542,268 B1  4/2003 Rotolo et al.
(Continued)

FOREIGN PATENT DOCUMENTS

EP  1 199 905 A2  4/2002
EP  2680606 A1  1/2014

OTHER PUBLICATIONS

Steven Gringeri et al, "Flexible Architectures for Optical Transport Nodes and Networks", IEEE Communications Magazine, IEEE Service Center, Piscataway, US, vol. 48, No. 7, Jul. 1, 2010, pp. 40-50.

(Continued)

*Primary Examiner* — Shi K Li
(74) *Attorney, Agent, or Firm* — Patterson Thuente Pedersen, P.A.

(57) ABSTRACT

An optical switch suitable for use in a ROADM of an optical network node having one or more optical fiber per direction, the fibers together carrying optical signals comprising up to N independent wavelength channels, is disclosed. The switch includes an Optical Cross-Connect (OXC) having $F_1$ input ports and $F_2$ output ports. At least one optical splitter, at least one optical combiner and at least two wavelength blockers are separately connected to the OXC, the input and output parts thereof defining ports of the OXC. The OXC is controllable to switch optical signals arriving at any of the $F_1$ switch input ports to any of the $F_2$ switch output ports via one or more of the optical splitters, wavelength blockers and/or optical combiners. A method for switching optical signals is also disclosed.

4 Claims, 8 Drawing Sheets (52) U.S. Cl.
CPC ...... *H04J 14/0217* (2013.01); *H04J 14/0219* (2013.01); *H04Q 2011/0015* (2013.01); *H04Q 2011/0058* (2013.01)

(56) References Cited

U.S. PATENT DOCUMENTS

| | | | |
|---|---|---|---|
| 6,792,208 | B1 | 9/2004 | Mukherjee et al. |
| 8,538,260 | B2 | 9/2013 | Niven-Jenkins et al. |
| 9,271,058 | B2 | 2/2016 | Lord |
| 2002/0054407 | A1 | 5/2002 | Yamada et al. |
| 2003/0138252 | A1 | 7/2003 | Paiam et al. |
| 2007/0147841 | A1 | 6/2007 | Takita et al. |
| 2009/0232497 | A1 | 9/2009 | Archambault |
| 2011/0110662 | A1 | 5/2011 | Wellbrock et al. |
| 2011/0164876 | A1 | 7/2011 | Fujita et al. |
| 2011/0217038 | A1* | 9/2011 | Zhang ............... H04Q 11/0005 398/48 |
| 2011/0262142 | A1 | 10/2011 | Archambault |
| 2012/0020664 | A1 | 1/2012 | Sakurai et al. |
| 2012/0301141 | A1 | 11/2012 | Sakamoto et al. |
| 2013/0045006 | A1 | 2/2013 | Dahan et al. |
| 2013/0142510 | A1 | 6/2013 | Zhou |
| 2014/0193148 | A1 | 7/2014 | Dahlfort et al. |
| 2016/0072608 | A1 | 3/2016 | Wright et al. |
| 2016/0241353 | A1 | 8/2016 | Wright et al. |

OTHER PUBLICATIONS

Extended European Search Report for European Patent Application No. 12250127.3, dated Dec. 17, 2012, 7 pages.
International Search Report, for PCT Application No. PCT/GB2013/000209, dated Jun. 17, 2013, 3 pages.
International Search Report, for PCT Application No. PCT/GB2014/000090, dated Jun. 16, 2014, 2 pages.
International Search Report, for PCT Application No. PCT/GB2014/000092, dated Jul. 2, 2014, 2 pages.
Application and File History for U.S. Appl. No. 14/409,745, filed Dec. 19, 2014. Inventors: Lord et al.
Application and File History for U.S. Appl. No. 14/780,932, filed Sep. 28, 2015. Inventors: Lord.
Application and File History for U.S. Appl. No. 14/780,959, filed Sep. 28, 2015. Inventors: Lord.
Taylor, "Trends in Dynamic Optical Networks", Nov. 5, 2007, 8 pages.
Frisken, Steven et al., "Wavelength-selective Reconfiguration in Transparent Agile Optical Networks", Proceedings of the IEEE, vol. 100, No. 5, May 2012.
Wang et al., "OSPF Extensions for Routing Constraint Encoding in Flexible-Grid Networks" IETF Network Working Group, China Academy of Telecom, MIIT, Internet Draft, Jul. 16, 2012.
International Search Report, International Application No. PCT/GB2014/000091, mailed Jul. 2, 2014, 2 pages.

* cited by examiner

OPTICAL SWITCH

RELATED APPLICATIONS

The present application is a National Phase entry of PCT Application No. PCT/GB2014/000091, filed Mar. 12, 2014, which claims priority to GB 1305801.1, filed Mar. 28, 2013, the contents of which are incorporated herein by reference in their entireties.

TECHNICAL FIELD

Embodiments relate to optical data transmission and particularly but not exclusively to an optical switching apparatus for switching optical signals.

BACKGROUND

In optical data transmission, a signal to be transmitted is sent as a sequence of light pulses over an optical fiber to a photo detector which converts the optical signal into an electronic one for subsequent processing. The most straightforward method of data transmission is to provide a different optical fiber per transmission. However, the use of a different fiber per transmission is expensive and therefore various techniques were proposed to allow multiple signals to be transmitted over a single fiber. The two most common techniques are Time Division Multiplexing (TDM) and Wavelength Division Multiplexing (WDM).

In TDM, separate input signals are carried on a single fiber by allocating time transmission windows. The input signals are fed to a multiplexer which schedules use of the optical fiber so that each input signal is allowed to use the fiber in a specific time slot. At the receiver, synchronization techniques are used to ensure that the different input signals are sent on to the appropriate destination.

In WDM, the fiber is shared by sending each input signal at the same time, but on a different carrier wavelength channel, for example a first signal could be transmitted using a carrier wavelength of 1539 nm and another signal is transmitted using a carrier signal of 1560 nm.

All modern optical data transmission utilizes TDM, with core transmission additionally utilizing WDM. In core data transmission, individual signals rates of up to 100 Gbit/sec are achieved through the use of TDM; these individual signals are then multiplexed onto a signal fiber through WDM in order to further enhance the transmission rate.

Considering WDM in greater detail, a grid of wavelengths is specified by the International Telecommunication Union (ITU) so that compliant equipment from different manufacturers can operate together. The ITU has specified a number of Dense Wavelength Division Multiplexing grid sizes at 12.5 Ghz, 25 Ghz, 50 Ghz and 100 Ghz. 50 Ghz is currently the most popular channel and, using the DP-QPSK modulation format, it is possible to fit a 100 Gbit/s signal within a single channel in the 50 Ghz grid. However, research into optical transmission beyond 100 Gbit/s has shown that higher spectral efficiency formats have to be used, or the spectral width of the signals must be increased to support 400 Gbit/s or 1 Tbit/s transmission. Utilizing modulation formats with higher spectral efficiencies limits the distance the signal can propagate due to OSNR penalties, and increasing the spectral width means that the signal can no longer fit within the widely deployed 50 Ghz ITU grid. To overcome these problems, flexible grid or Flexgrid networks have been proposed. In this scheme, arbitrary sized wavelength blocks can be specified by the network owner, thereby accommodating new bit rate services.

In order to transmit signals by WDM, whether on the fixed grid or flexible grid network, two signals having different carrier wavelengths must be multiplexed onto the same optical fiber. Providing the carrier wavelengths are sufficiently different, the signals will not interfere with each other.

Optical fibers carrying the multiplexed signals meet other optical fibers carrying different multiplexed signals at a network node. A node generally consists of two parts: add/drop (A/D) and bypass routing. The add/drop component is arranged for dropping optical signals at certain wavelength channels for transmission to receivers associated with the node. The add/drop component is also arranged for adding optical signals at certain wavelength channels to the optical signals already carried on the optical fibers. In contrast, the bypass routing component is arranged for routing wavelength channels received via node input fibers to the correct node output fibers to enable onward transmission to the desired adjacent nodes. The input optical signals are demultiplexed into the individual wavelength channels by the bypass router, switched to the desired output and re-multiplexed for onwards transmission. The bypass routing component treats the individual wavelength channels separately: one wavelength channel may be routed through the node differently to another wavelength channel. One known component for bypass routing is a Reconfigurable Optical Add-Drop Multiplexer (ROADM).

The above-mentioned nodes at which these fibers meet are classified according to the number of fiber directions that converge at that node. For example, if optical fibers deliver data to and from North, South and West then the node at which these fibers meet is a degree three node. Current telecommunications networks comprise a single optical fiber for data transmission in a given direction. It will be appreciated that six fibers converge at a degree three node if the network comprises a single fiber per direction: one fiber for data transmission from North, one fiber for data transmission to North, etc.

However, due to the ever increasing bandwidth demands on telecommunications networks, it is anticipated that multiple fibers in one or more directions will be required in the near future. Accordingly, many more fibers will converge at a node of a given degree. For example, a degree three node in a "multi-fiber" network may comprise six or more fibers. In a "multi-fiber" arrangement such as this, it is envisaged that a number of independent channels or superchannels will be spread across the multiple fibers, the number of channels or superchannels carried on any one of the fibers being variable in accordance with the optical spectrum and/or the network architecture.

It is envisaged that improvements to current node technology will be required in order to cope with the demand of multi-fiber networks. In particular, known bypass routing components typically demultiplex WDM optical signals via Wavelength Selective Switches (WSSs). These switches disperse optical signals by means of a diffraction grating or the like, which enables each wavelength channel within the optical signals to be treated differently, i.e. blocked or allowed to pass through the switch. A 1×N WSS enables any wavelength channel that is received by the switch to be output at any of the N output ports thereof. Whilst these known bypass routing components function effectively for single optical fiber inputs, it would be expensive to provide sufficient WSS capacity within a multi-fiber network. In particular, if the multi-fiber network is configured to transmit N independent wavelength channels or superchannels across F optical fibers then any one of the optical fibers could carry optical signals comprising N independent wavelength channels. Accordingly, F 1×N WSS switches would be required for demultiplexing the optical signals (i.e. one for every fiber) in order to cope with all possible wavelength channel distributions. Whilst it would be possible to construct a bypass router in this way, WSSs are expensive, particularly those having a large number of output ports.

SUMMARY

Embodiments address the above issues. In one aspect, an embodiment provides an apparatus for switching optical signals, the apparatus being configured to handle optical signals comprising up to N independent wavelength channels, the apparatus comprising: a controllable all optical matrix switch comprising $F_1$ switch input ports, $F_2$ switch output ports and switch ports connected to one or more optical splitters, to two or more wavelength blockers and to one or more optical combiners; and means configured (a) to detect, in use, each input optical fiber carrying optical signals destined for more than one output optical fiber, and for each such optical fiber to control the switch either (a1) to switch the optical signals from the respective switch input port to an input port of a respective one of the optical splitters, and to switch the optical signals output by splitter output ports of the optical splitter to respective switch output ports, either directly, or indirectly in accordance with (a2) and (b), and (a2) where the optical signals comprise n wavelength channels of which $n_p$<n are destined for a given output optical fiber, to switch the optical signals to a wavelength blocker configured to permit said $n_p$ wavelength channels to pass to said given output optical fiber and block respective others of said n wavelength channels, or (a3) where the optical signals comprise n wavelength channels of which $n_p$<n are destined for a given output optical fiber, to switch the optical signals from the respective switch input port to a wavelength blocker configured to permit said $n_p$ wavelength channels to pass to said given output optical fiber and block respective others of said n wavelength channels, and (a4) to switch the passed wavelength channels to a respective one of the optical splitters, and to switch the optical signals output by splitter output ports of the optical splitter to respective switch output ports, either directly, or indirectly in accordance with (b); and (b) to detect, in use, each output optical fiber defining a destination for optical signals from at least two input optical fibers, and for each such optical fiber to control the switch to switch the optical signals to the respective output port via an optical combiner, the optical combiner being arranged to receive inputs from said at least two input optical fibers.

In use, optical signals comprising a plurality of independent wavelength channels may be received at one or more of the $F_1$ switch input ports. Accordingly, the apparatus is suitable for use in a node having up to $F_1$ optical fibers in a given direction. The signals received at each switch input port may be switched to any one of the optical splitters. The switch may be controlled to switch optical signals received at a given switch input port to an optical splitter comprising at least as many output ports as the number of independent wavelength channels received at the switch input port. The optical signals output by the optical splitters may be switched to respective wavelength blockers, each of the wavelength blockers ideally being configured to allow a different wavelength channel to pass therethrough. The single wavelength channel output by each wavelength blocker may be switched to the optical combiners, where they are combined to produce optical signals having a different plurality of independent wavelength channels to those received at the switch input ports. The combined signals output by any of the optical combiners may be switched to any one of the switch output ports.

Advantageously, embodiments obviate the requirement for $F_1$ 1×N WSSs in order to demultiplex the optical signals. Instead, the signal demultiplexing is achieved by inexpensive optical splitters and wavelength blockers. Furthermore, re-multiplexing is achieved by inexpensive optical combiners.

The switch may be controllable to switch optical signals from any one of the $F_1$ switch input ports to an input port of any one of the optical splitters. At least one of the optical splitters may comprise a different number of splitter output ports to at least another of the optical splitters. Each of the optical splitters may comprise a different number of splitter output ports to respective others of the optical splitters. Advantageously, not all of the optical splitters need to be 1×N optical splitters due to the reconfigurable coupling provided by the optical matrix switch between the switch input ports and the optical splitters. The use of smaller optical splitters provides a further reduction in the cost of the apparatus through reduced optical matrix switch port usage.

The switch may be controllable to switch optical signals from any one of the $F_1$ switch input ports to any one of the wavelength blockers.

The switch may be controllable to switch optical signals from any one of the $F_1$ switch input ports to an input port of any one of the optical combiners. It is envisaged that optical signals will be switched to an optical combiner if it is required to combine the optical signals with other optical signals received at different switch input ports.

The switch may be controllable to switch optical signals from any output port of any of one of the optical splitters to any one of the wavelength blockers. It is envisaged that optical signals comprising more than one wavelength channel will be split into at least as many copies as the number of wavelength channels and each copy switched to a wavelength blocker arranged to output a different wavelength channel. Accordingly, the optical splitters and wavelength blockers together act as a WSS.

The switch may be controllable to switch optical signals from any output port of any one of the optical splitters to an input port of any one of the optical combiners. The switch may be controllable to switch optical signals from any output port of any one of the optical splitters to any one of the $F_2$ switch output ports. One reason for switching optical signals received at a switch input port to an optical splitter may be that the optical signals are destined for two or more output ports. If this is the case and the optical signals do not comprise multiple wavelength channels, then the optical signals output by the optical splitter may be switched directly to the optical combiners or switch output ports.

The switch may be controllable to switch optical signals from any output port of any one of the optical splitters to any one of the $F_2$ switch output ports.

The switch may be controllable to switch optical signals from any one of the wavelength blockers to an input port of any one of the optical combiners.

The switch may be controllable to switch optical signals from any one of the wavelength blockers to any one of the $F_2$ switch output ports.

The switch may be controllable to switch optical signals from an output port of any one of the optical combiners to any one of the $F_2$ switch output ports.

The switch may be controllable to switch optical signals from any output port of any of one of the optical splitters to an input port of any other of the respective other optical splitters. Advantageously this enables the so-called cascading of optical splitters and thus minimizes the number of splitter output ports required on any one optical splitter.

N may be greater than one.

$F_1$ may be greater than one. The $F_1$ switch input ports may be configured to receive optical signals carried on respective $F_1$ input optical fibers.

$F_2$ may be greater than one. The $F_2$ switch output ports may be configured to output optical signals for transmission on respective $F_2$ output optical fibers.

$F_1$ and $F_1$ may be equal.

The apparatus may comprise $F_1$ optical splitters. In this embodiment, the optical signals received at each of the $F_1$ switch input ports may be switched to respective optical splitters. Advantageously, this enables the apparatus to handle a wavelength channel distribution in which each of the $F_1$ input optical fibers carry optical signals comprising two or more independent wavelength channels.

The apparatus may comprise $F_2$ optical combiners. In this embodiment, the optical signals combined at each of the $F_2$ optical combiners may be switched to respective switch output ports. Advantageously, this enables the apparatus to output optical signals comprising two more independent wavelength channels to each of the $F_2$ output optical fibers.

The optical splitters, wavelength blockers and optical combiners may be individually optically coupled to the optical matrix switch such that input ports and output ports thereof define respective ports of the optical matrix switch.

Each of the optical splitters may comprise a single splitter input port and two or more splitter output ports.

The optical combiners may comprise two or more combiner input ports and a single combiner output port.

Each of the wavelength blockers may respectively comprise a 1×1 Wavelength Selective Switch (WSS).

At least one of the wavelength blockers may be configured to block different wavelength channels to at least another of the wavelength blockers.

Each of the wavelength blockers may be configured to block different wavelength channels to respective others of the wavelength blockers.

Each of the wavelength blockers may be configured to receive optical signals comprising one or more of said up to N independent wavelength channels thereof and output optical signals comprising a single wavelength channel.

The apparatus may comprise N wavelength blockers. Each of the N wavelength blockers may be configured to permit a different wavelength channel belonging to said up to N independent wavelength channels to pass therethrough. Alternatively, each of the N wavelength blockers may be configured to block a different wavelength channel belonging to said up to N independent wavelength channels. In the latter embodiment, optical signals may be switched to multiple wavelength blockers before being switched to the respective switch output port in order to block all of the unwanted wavelength channels.

At least one of the optical splitters may comprise at least N splitter output ports. Advantageously, this arrangement accommodates a number of potential wavelength channel distributions, including the extreme distribution in which all N wavelength channels are carried by just one optical fiber and hence received at a single switch input port. In this example wavelength distribution, the switch is configured such that the switch input port arranged to receive the optical fiber carrying all N wavelength channels is optically coupled to the splitter input port of the splitter comprising at least N splitter output ports.

The apparatus may comprise control means for controlling the optical matrix switch.

The control means may comprise a processor arranged to execute a control plane function having overall network control, the apparatus being a slave to the control plane function. The control plane function may be programmable by a human user. In this way, the optical matrix switch may be controllable by a human user.

Alternatively, the control means may be arranged to receive information relating to the number of independent wavelength channels N received at each of the $F_1$ switch input ports and switch optical signals arriving at each of the $F_1$ switch input ports in accordance with said information. The apparatus may comprise means for determining said information relating to the number of independent wavelength channels N arriving at each of the switch input ports and provide said information to the control means.

In another aspect, an embodiment provides a method for switching optical signals from $F_1$ input optical fibers to $F_2$ output optical fibers, the optical signals received via the $F_1$ input optical fibers together comprising N independent wavelength channels and the optical signals output to the $F_2$ output optical fibers together comprising up to N independent wavelength channels, the method comprising: (a) providing an optical matrix switch comprising $F_1$ switch input ports and $F_2$ switch output ports; (b) connecting the $F_1$ input optical fibers to respective $F_1$ switch input ports and the $F_2$ output optical fibers to respective $F_2$ switch output ports; (c) connecting to respective ports of the optical matrix switch: one or more optical splitters, two or more wavelength blockers and one or more optical combiners; and, (d) for each input optical fiber carrying optical signals destined for more than one output optical fiber, either (d1) switching the optical signals from the respective switch input port to an input port of a respective one of the optical splitters, and switching the optical signals output by splitter output ports of the optical splitter to respective switch output ports, either directly, or indirectly in accordance with (d2) and (e), and (d2) where the optical signals comprise n wavelength channels of which $n_p<n$ are destined for a given output optical fiber, switching the optical signals to a wavelength blocker configured to permit said $n_p$ wavelength channels to pass to said given output optical fiber and block respective others of said n wavelength channels, or (d3) where the optical signals comprise n wavelength channels of which $n_p<n$ are destined for a given output optical fiber, switching the optical signals from the respective switch input port to a wavelength blocker configured to permit said $n_p$ wavelength channels to pass to said given output optical fiber and block respective others of said n wavelength channels, and (d4) switching the passed wavelength channels to a respective one of the optical splitters, and switching the optical signals output by splitter output ports of the optical splitter to respective switch output ports, either directly, or indirectly in accordance with (e); and (e) for optical signals destined for an output optical fiber that defines a destination for optical signals from at least two input optical fibers, switching the optical signals to the respective output port via an optical combiner, the optical combiner being arranged to receive inputs from said at least two input optical fibers.

The optical signals received at the $m^{th}$ switch input port belonging to said $F_1$ switch input ports may comprise n(m) independent wavelength channels, where n(m)≤N and n(m) may be different for different switch input ports.

The optical signals received at the $m^{th}$ switch input port may be at least partially destined for $f_2(m)$ of the $F_2$ switch output ports, each of the $f_2(m)$ switch output ports defining a destination for one or more of said n(m) independent wavelength channels. The $p^{th}$ switch output port belonging to the $F_2$ switch output ports may define a destination for $n_p(m)$ independent wavelength channels received at the $m^{th}$ switch input port.

BRIEF DESCRIPTION OF THE DRAWINGS

Embodiments will now be described with reference to the accompanying Figures in which.

DETAILED DESCRIPTION

Definitions

As used herein, a "wavelength channel" is defined as a wavelength or a spectrum of wavelengths associated with a certain signal. It will be appreciated that the term includes, but is not limited to, a single optical carrier, typically a sine wave, with modulation. The term also includes so-called "superchannels," in which multiple optical carriers (rather than a single optical carrier) are modulated and the combined group of modulated carriers are treated as a single channel.

As used herein, an "optical coupler" is defined as a device arranged to distribute optical signals received at one or more input ports to one or more output ports thereof. An M×N optical coupler comprises M input ports and N output ports. There are two primary types of optical coupler: optical splitters and optical combiners, both of which are defined below.

As used herein, an "optical splitter" is defined as a device arranged to receive optical signals at an input port thereof and output a copy of the received optical signals at each of multiple output ports thereof. A 1×N optical splitter comprises one input port and N output ports; optical signals received at the input port are branched to all of the N output ports.

As used herein, an "optical combiner" is defined as a device arranged to combine optical signals received at two or more input ports thereof and output the combined signal at an output port thereof. An M×1 optical combiner comprises M input ports and 1 output port; optical signals received at the M input ports are combined and the combined signals are output at the output port.

As used herein, a "wavelength blocker" is defined as a device arranged to block certain wavelengths within optical signals. A wavelength blocker may be arranged to block one or more wavelength channels within WDM optical signals.

Figure 1:
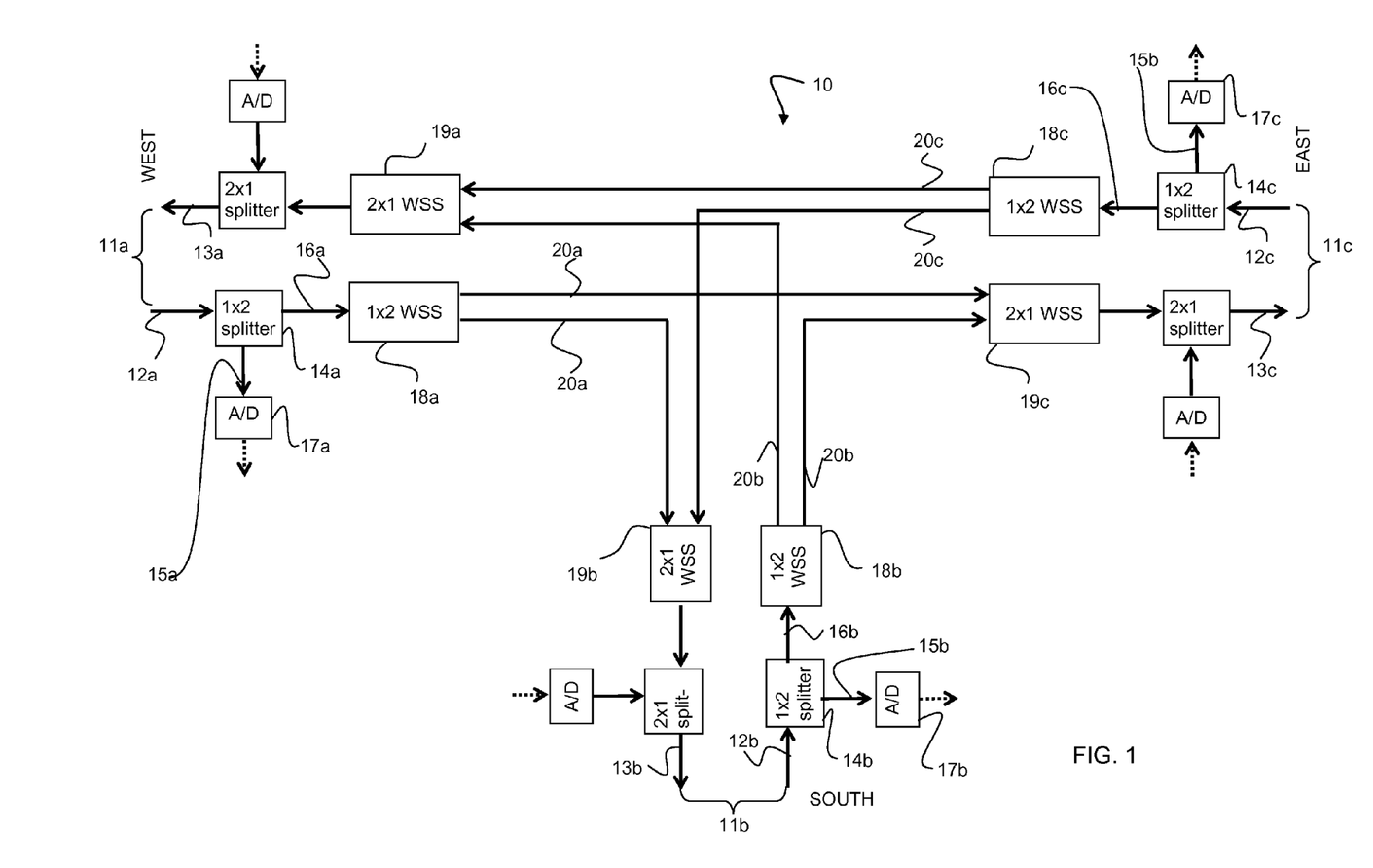
FIG. 1 shows an overview of a degree three node in a telecommunications network, the network comprising a single optical fiber in each direction.

FIG. 1 schematically illustrates a node 10 in a telecommunications network. Nodes such as that illustrated in FIG. 1 are known in the art.

The node 10 comprises three sets of optical fibers 11a, 11b, 11c. Each of the three sets of optical fibers 11 is associated with a different spatial location with respect to the node 10, thereby rendering the node a degree three node. The three spatial locations will henceforth be referred to as West, East and South for ease of reference.

Each set of optical fibers 11 is made up of two fibers: a node input fiber 12 for transporting optical signals towards the node 10 and a node output fiber 13 for transporting optical signals away from the node 10. This type of network is currently widely used across the telecommunications industry.

Each of the optical fibers 12, 13 is suitable for carrying Wavelength Division Multiplexed (WDM) optical signals, i.e. optical signals that comprise a plurality of independent wavelength channels.

At the node 10, each node input optical fiber 12 is coupled to the input port (not shown) of a 1×2 passive optical splitter 14. Each splitter 14 comprises two output ports (not shown) coupled to respective optical fibers 15, 16. The optical fibers 15, 16 are arranged to transmit optical signals from the optical splitter 14 to an add/drop (A/D) 17 or to a Reconfigurable optical add-drop multiplexer (ROADM), respectively.

The A/D 17 is arranged for "dropping" certain wavelength channels carried by the node input optical fiber 12 at the node 10, whilst the ROADM is arranged for routing certain wavelength channels through the node 10, e.g. from East to West.

In standard prior art nodes 10, the A/D 17 comprises a grating demultiplexer (not shown), which operates on the principle of light dispersion: the angle of deflection with respect to the normal of the demultiplexer is a function of wavelength. The grating therefore acts to break down the optical signal into its constituent wavelength spectrum, which enables certain wavelength channels within that spectrum to be isolated. The "dropped" channels can subsequently be transmitted to receivers or the like associated with the node 10, with different wavelength channels being transmitted to different receivers. For example, the node 10 may service a particular city, in which case the A/D 17 may be arranged for selecting certain wavelength channels intended to be received by receivers within the city.

The ROADM is formed of a number of Wavelength Selective Switches (WSSs) 18, 19 interconnected by optical couplings 20. In detail, a 1×2 WSS 18 is coupled to the output of the optical splitter 14 such that it receives optical signals therefrom. The outputs of the 1×2 WSS 18 are separately coupled to inputs of respective 2×1 WSSs 19 associated with directions other than the direction from which the node input fiber 12 originated. For example, the outputs of the West 1×2 WSS 18a are coupled to the inputs of the East 2×1 WSS 19c and South 2×1 WSS 19b. It will be appreciated that the 1×2 WSSs 18 and 2×1 WSSs 19 are appropriate for a degree three node 10, but the number of input and output ports provided on the WSSs 18, 19 may be varied in accordance with the degree of the node.

Whilst optical nodes 10 comprising a single fiber in each direction as illustrated in FIG. 1 are currently widely used, it is expected that a single fiber in each direction will not be sufficient to cope with the ever increasing bandwidth demands. Accordingly, it is anticipated that future optical nodes will have to cope with multiple optical fibers in one or more directions, each optical fiber potentially carrying a plurality of independent wavelength channels. Each direction could comprise multiple fibers or only certain directions could comprise multiple fibers, the remaining directions comprising a single fiber.

Figure 2:
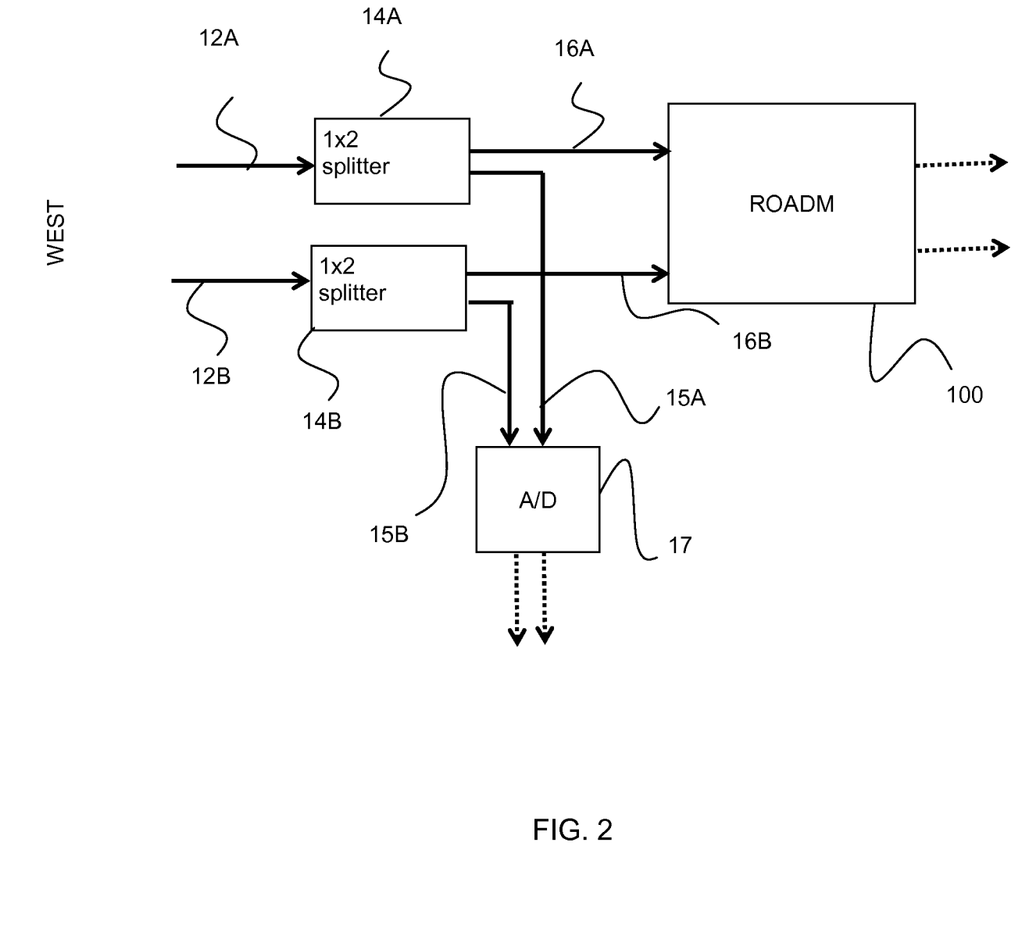
FIG. 2 shows a portion of node of a telecommunications network, the network comprising two optical fibers in each direction.

FIG. 2 illustrates a portion of an optical node suitable for use with two optical fibers per direction. For ease of reference, like parts have been given like reference numerals, with upper case alphabetic characters added in the case of pluralities of like parts. It should be noted that the upper case alphabetic character referencing system of FIGS. 2 to 4 is unrelated to the lower case alphabetic character referencing system of FIG. 1.

For the case of two optical fibers per direction, each of the node input optical fibers 12A, 12B from a given direction are received at respective 1×2 passive optical splitters 14A, 14B. For example, each of the optical fibers that arrive from West is passed to respective 1×2 optical passive splitters. Each of the 1×2 optical splitters 14 comprises two output ports (not shown). One output port is coupled to an A/D 17 by an optical fiber 15 and the other output port is coupled to a ROADM 100 by another optical fiber 16.

The A/D 17 is arranged for "dropping" certain wavelength channels at the node, whilst the ROADM 100 is arranged for routing certain wavelength channels through the node e.g. from East to West. Since there are two node input fibers 12A, 12B entering the node from each direction, the A/D 17 must be adapted to receive two input optical fibers 15A, 15B. A suitable A/D is disclosed in co-pending application GB1305798.9 of even date, entitled Optical Switch, also published as WO 2014/162108. Similarly, the ROADM 100 must be adapted to receive two input optical fibers 16A, 16B from each direction.

Figure 3:
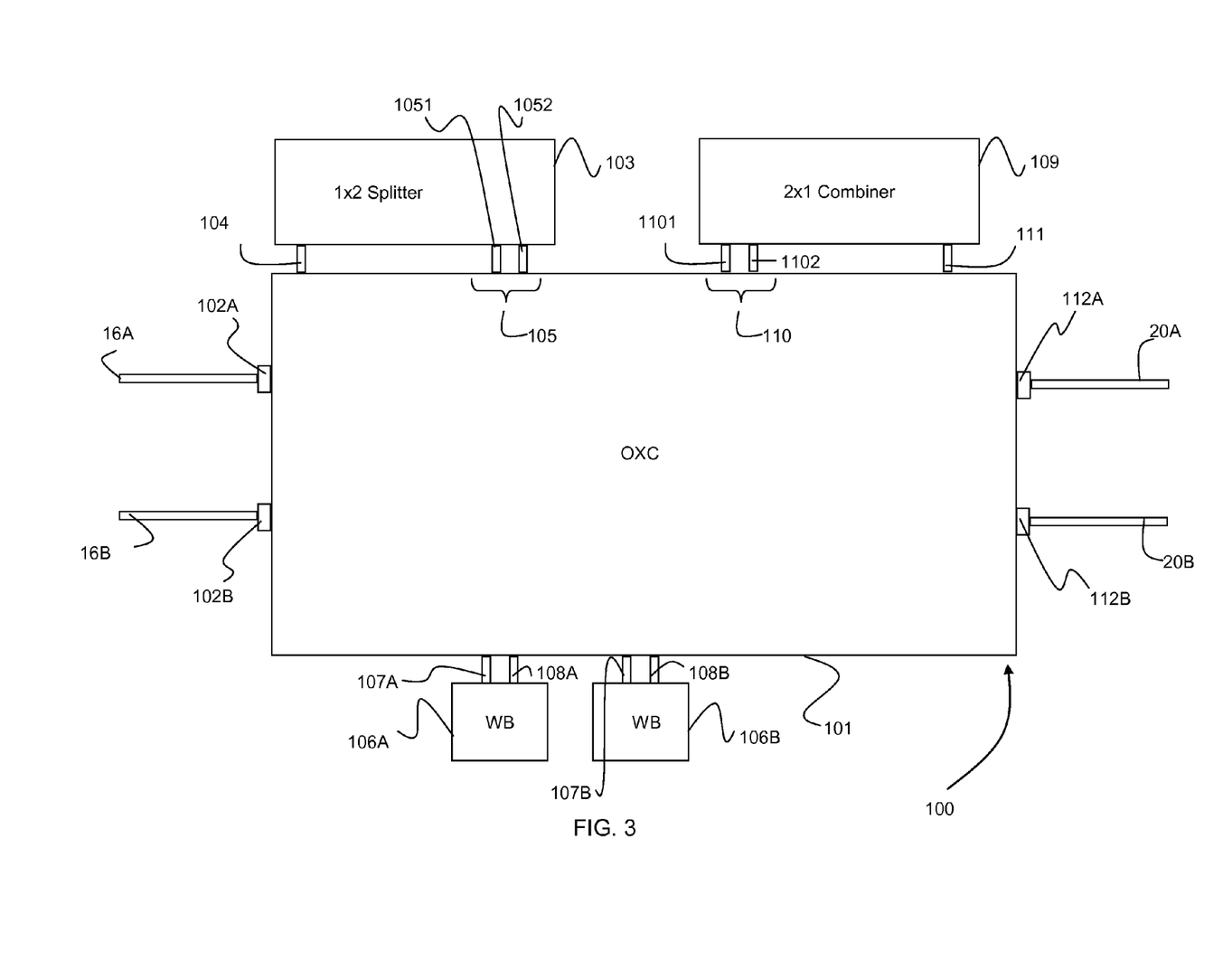
FIG. 3 shows an apparatus for switching optical signals in accordance with an embodiment.
Figure 4A:
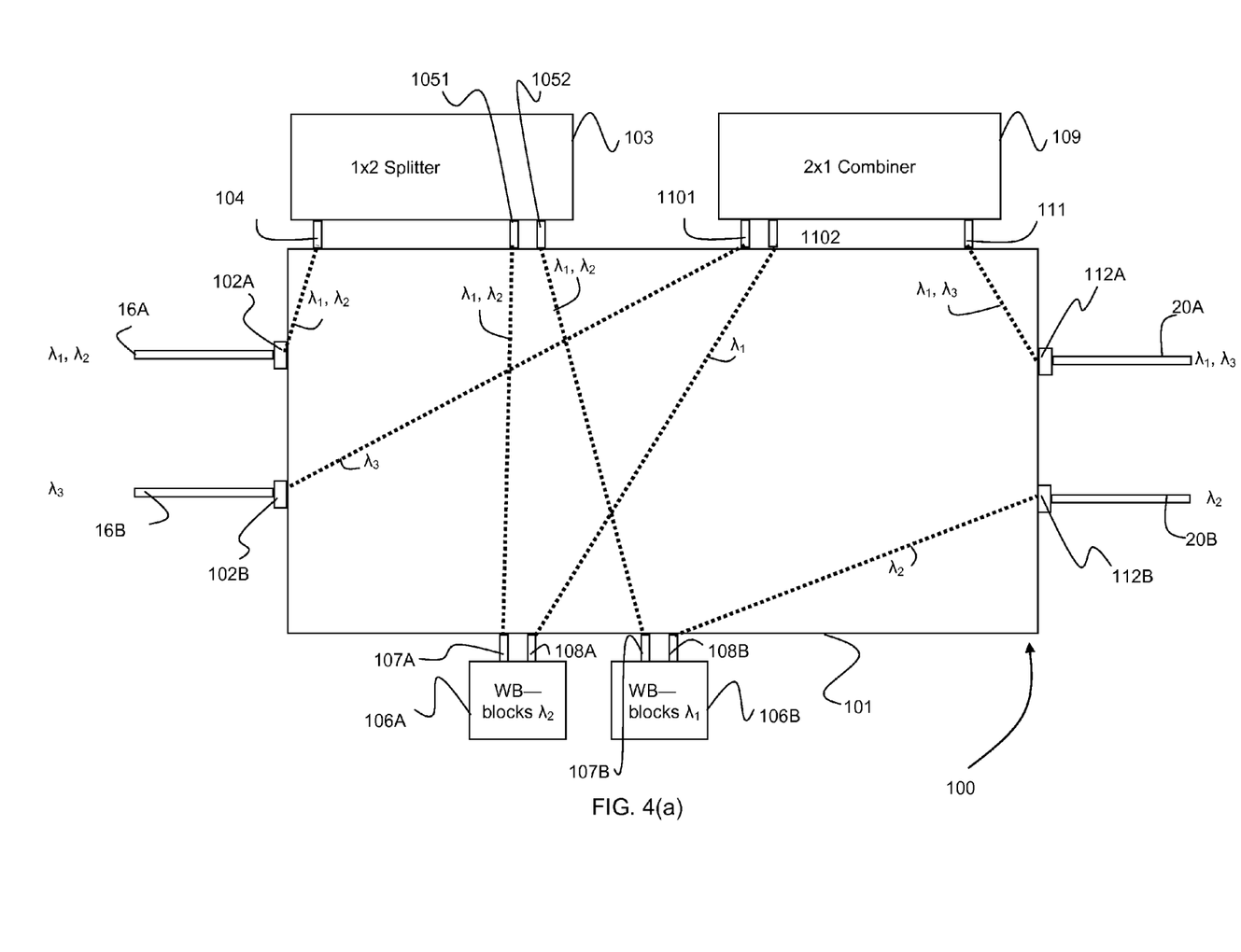
FIGS. 4(a) and 4(b) show alternative optical coupling configurations of the apparatus of FIG. 3.
Figure 4B:
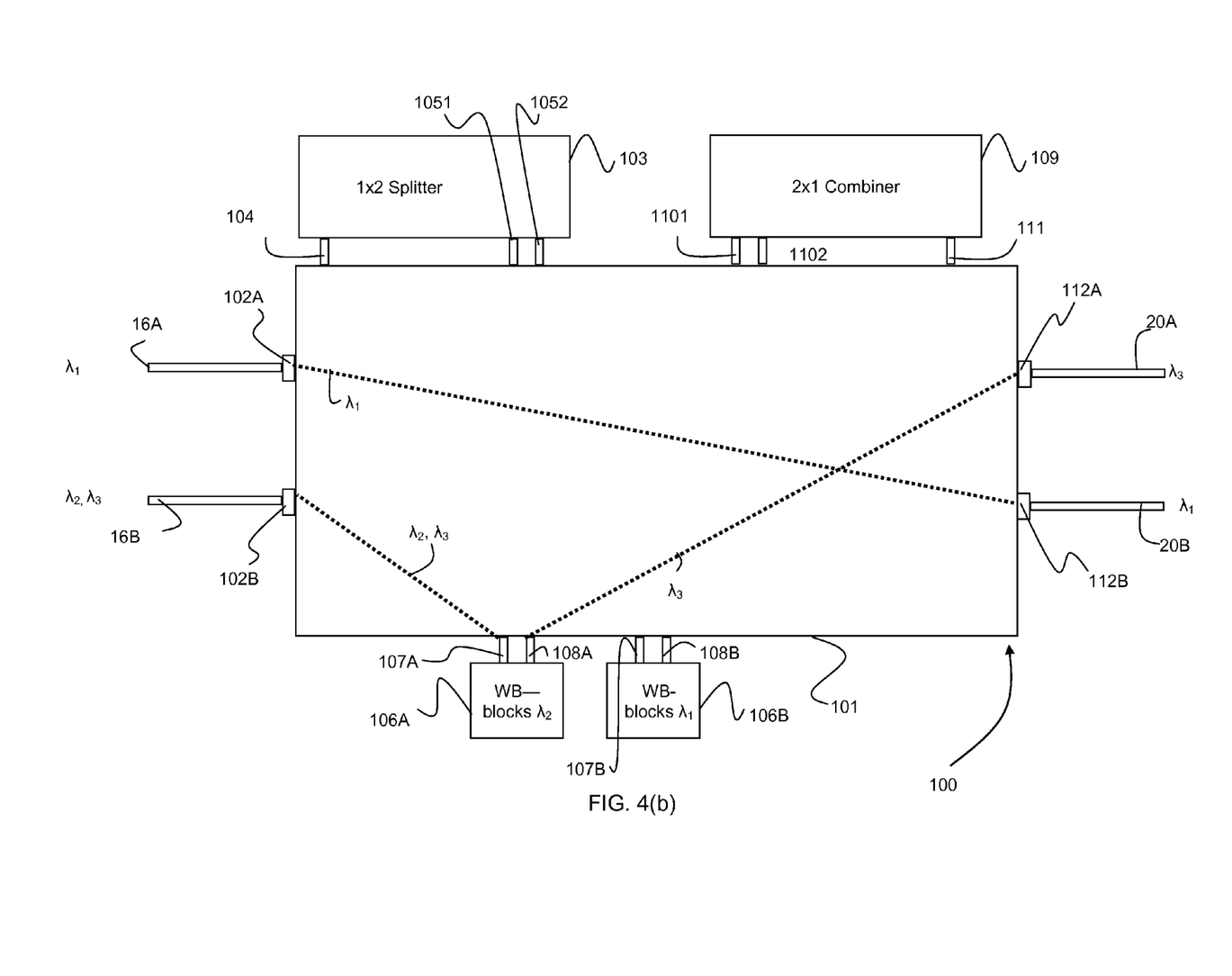

The ROADM 100 of FIG. 2 is shown in greater detail in FIGS. 3 and 4 of the drawings. It is envisaged that the embodiment illustrated in FIGS. 3 and 4 will be suitable for the case in which optical signals carried on one of the node input fibers 12 comprise up to one independent wavelength channel and optical signals carried on the other optical fiber 12 comprise up to two independent wavelength channels. It is anticipated that the distribution of wavelength channels between the node input fibers 12 of a multi-fiber network such as that illustrated in FIG. 2 is likely to vary during the lifetime of the network, for example in accordance with the network architecture and the portion of the optical spectrum covered by the independent wavelength channels.

With particular reference to FIGS. 3 and 4 of the drawings, the ROADM 100 comprises an all optical matrix switch in the form of an Optical Cross-Connect (OXC) 101. The OXC 101 may comprise a matrix of optical fibers with reconfiguration of the optical fibers between different ports of the OXC achieved by applying varying voltages to the optical fibers. Alternatively, the OXC may comprise MEMs optical elements or any other suitable all optical matrix switch known in the art.

The two switch input ports 102A, 102B are arranged to receive respective input optical fibers 16A, 16B. For ease of reference, these input optical fibers 16A, 16B will henceforth be referred to as first 16A and second 16B input optical fibers, and the switch input ports 102A, 102B as first 102A and second 102B switch input ports.

Two switch output ports 112A, 113B are arranged to output optical signals to respective output optical fibers 20A, 20B. These output optical fibers will henceforth be referred to as first 20A and second 20B output optical fibers, and the switch output ports 112A, 112B as first and second switch output ports.

A passive optical splitter 103 is connected to the OXC 101. The optical splitter 103 is a 1×2 optical splitter, comprising a splitter input port 104 and first 1051 and second 1052 splitter output ports 105. Accordingly, the optical splitter 103 is arranged for producing two identical copies of any signal received at the input port 104 thereof. The splitter input port 104 and the splitter output ports 105 of the optical splitter 103 constitute respective ports of the OXC 101.

Two wavelength blockers 106A, 106B are separately connected to the OXC 101. Each wavelength blocker 106 comprises an input port 107 and an output port 108. Each wavelength blockers 106 is configured to receive optical signals comprising one or more wavelength channels at the input port 107 thereof, block certain wavelength channels and output optical signals comprising the remaining wavelength channels at the output port thereof 108. It is envisaged that the first wavelength blocker 106A is configured to block different wavelength channels to the second wavelength blocker 106B. However, there may be occasions in which multiple wavelength blockers arranged to block identical wavelength channels are provided, for example is optical signals directed towards different switch output ports 112 require identical wavelength channel blocking.

A passive optical combiner 109 is connected to the OXC 101. The optical combiner 103 is a 2×1 optical combiner, comprising first 1101 and second 1102 combiner input ports 110 and a combiner output port 111. Accordingly, the optical combiner 109 is arranged for providing the reverse effect to the optical splitter 103: optical signals received at the two input ports 110 thereof are combined and the combined optical signals are output at the output port 111 thereof. It will be appreciated that optical signals comprising different wavelength channels may be combined to give a combined optical signal comprising all of the wavelength channels present in the optical signals received a the input ports 110.

The fiber matrix connections within the OXC 101 may reconfigured according to the distribution of wavelength channels between the two input optical fibers 16A, 16B and hence according to the distribution of wavelength channels between the two node input fibers 12A, 12B. It is envisaged that the ROADM 100 will be a slave to a control plane function, with reconfiguration of the fiber matrix connections within the OXC 101 achieved by means of a network wide control. However, an "intelligent" ROADM 100 is also within the scope of embodiments. For example, the ROADM 100 may itself determine the wavelength channel distribution and reconfigure the fiber matrix connections within the OXC 101 appropriately.

FIGS. 4(*a*) and 4(*b*) illustrate example optical couplings between the above-described components connected to the OXC 101.

FIG. 4(*a*) shows an example configuration of the ROADM 100 illustrated in FIG. 3 for the case of two wavelength channels $\lambda_1$, $\lambda_2$ received at the first switch input port 102A and one wavelength channel $\lambda_3$ received at the second switch input port 102B. It is desired to switch the wavelength channels $\lambda_1$ and $\lambda_3$ to the first switch output port 112A for onward transmission on the first output optical fiber 20A and switch the wavelength channel $\lambda_2$ to the second switch output port 112B for onward transmission on the second output optical fiber 20B.

Figure 7:
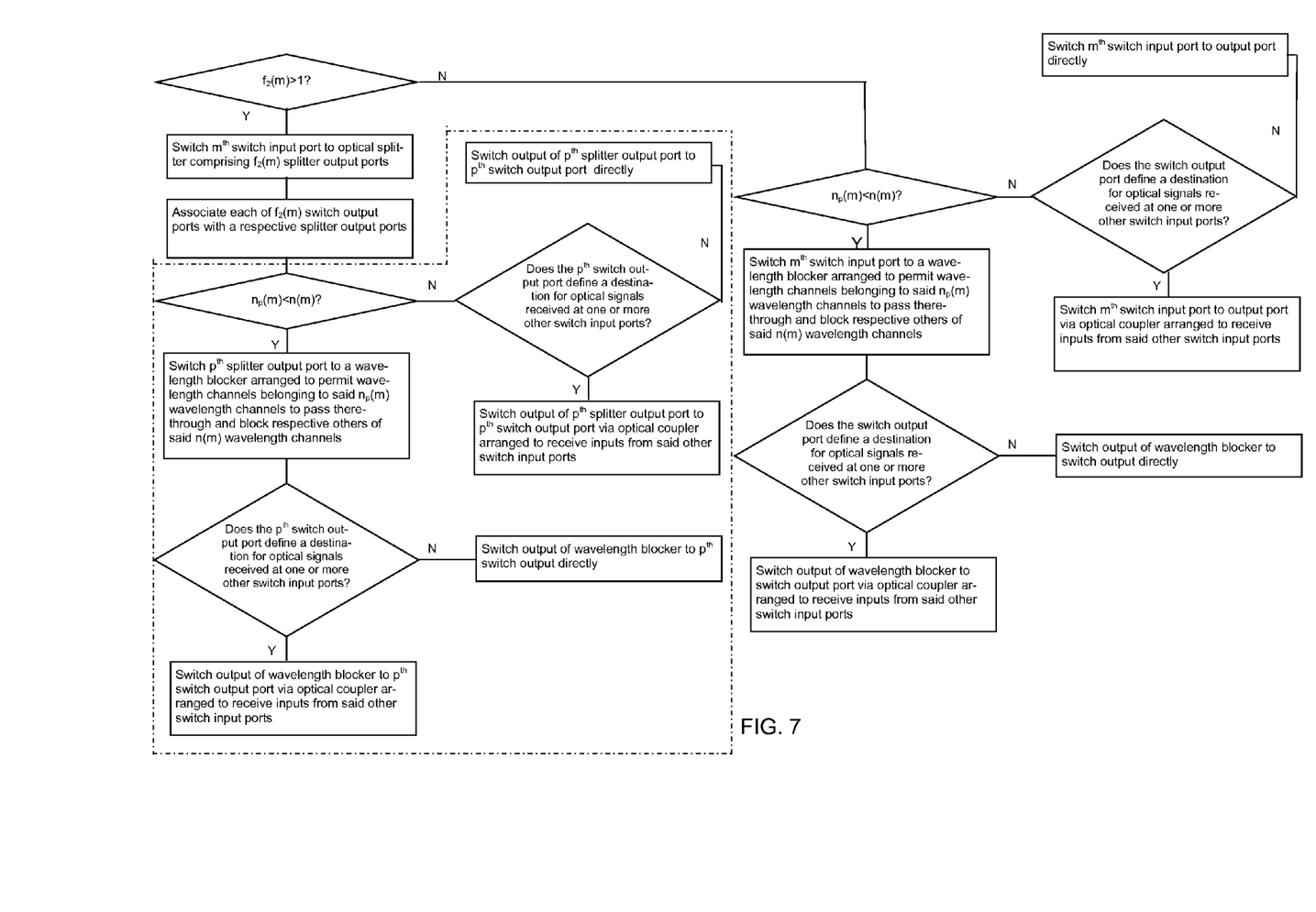
FIG. 7 shows a flow diagram of a method of switching optical signals in accordance with an embodiment.

Adopting the notation of FIG. 7, the optical signals received at the switch input ports 102 together comprise N independent wavelength channels. The optical signals received at the $m^{th}$ switch input port comprise n(m) independent wavelength channels. These optical signals may be at least partially destined for $f_2(m)$ of the $F_2$ switch output ports, each of the $f_2(m)$ switch output ports defining a destination for one or more of said n(m) independent wavelength channels. The $p^{th}$ switch output port belonging to the $F_2$ switch output ports may define a destination for $n_p(m)$ independent wavelength channels received at the $m^{th}$ switch input port.

For the embodiment illustrated in FIG. 4(a):

$N=3[\lambda_1,\lambda_2,\lambda_3]$ $f_2(1)=2$ [$\lambda_1$ to the first switch output port 112A and $\lambda_2$ to the second switch output port 112B]
$f_2(2)=1$ [$\lambda_3$ to the first switch output port 112A]
$n(1)=2$ [$\lambda_1,\lambda_2$]; $n_1(1)=1$ [$\lambda_1$] and $n_2(1)=1$ [$\lambda_2$]
$n(2)=1$ [$\lambda_3$]; $n_1(2)=1$ [$\lambda_3$] and $n_2(2)=0$ With reference to FIGS. 4(a) and 7 of the drawings, and initially considering the optical signals received at the first switch input port 102A:

The optical signals received at the first switch input port 102A are destined for more than one switch output port ($f_2(1)=2$) and hence the optical signals must be switched to the input port 104 of the optical splitter 103. Identical copies of the optical signals are thus output at the first 1051 and second 1052 splitter output ports 105 of the optical splitter 103. In the illustrated embodiment, the optical signals output at the first splitter output port 1051 are associated with the first switch output port 112A, and the optical signals output at the second splitter output port 1052 are associated with the second switch output port 112B. However, it will be appreciated that this configuration could be reversed.

Considering the optical signals associated with the first switch output port 112A first, it is desired to switch $n_1(1)=1$ wavelength channels to the first switch output port 112A. Since the optical signals output at the first splitter output port 1051 comprise $n(1)=2$ wavelength channels, these optical signals must be switched to a wavelength blocker 106A. It is desired to switch the wavelength channel $\lambda_1$ to the first switch output port 112A and thus the wavelength blocker 106A must be configured to block the other wavelength channel $\lambda_2$ from the optical signals.

The first switch output port 112A defines a destination for optical signals from the second switch input port 102B in addition to signals from the first switch input port 102A. Accordingly, the optical signals from the wavelength blocker 106A must be switched at input port 1101 of the optical combiner 109, where the signals are combined with optical signals received from the second switch input port 102B, the combined signals being subsequently switched to the first switch output port 112A.

The portion of the flow diagram of FIG. 7 contained within the dashed box is repeated for the optical signals associated with the second switch output port 112B. It is desired to switch $n_2(1)\times 1$ wavelength channels to the second switch output port 112B. Since the optical signals output at the second splitter output port 1052 comprise $n(1)=2$ wavelength channels, these optical signals must be switched to a wavelength blocker 106B. It is desired to switch the wavelength channel $\lambda_2$ to the second switch output port 112B and thus the wavelength blocker 106A must be configured to block the other wavelength channel $\lambda_1$ from the optical signals.

The second switch output port 112B defines a destination for optical signals from the first switch input port 102A only. Accordingly, the optical signals from the wavelength blocker 106B are directly switched to the second switch output port 112B.

The entire flow diagram of FIG. 7 is repeated for the second switch input port 102B:

The optical signals received at the second switch input port 102B are destined for the first switch output port 112A only ($f_2(2)=1$) and hence no splitting of the optical signals is required.

It is desired to switch $n_1(2)=1$ wavelength channel to the first switch output port 112A. Since the optical signals received at the second switch input port 102B comprise $n(2)=1$ wavelength channel, no blocking of wavelength channels is required.

As discussed above, the first switch output port 112A defines a destination for optical signals from the first switch input port 102A in addition to signals from the second switch input port 102B. Accordingly, the optical signals from the second switch input port 102B must be switched an input port 1102 of the optical combiner 109, where the signals are combined with optical signals received from the first switch input port 102B (via the optical splitter 103 and the first wavelength blocker 106A) and the combined signals switched to the first switch output port 112A.

FIG. 4(b) shows an example configuration of the ROADM 100 illustrated in FIG. 3 for the case of one wavelength channel $\lambda_1$ received at the first switch input port 102A and two wavelength channels $\lambda_2$, $\lambda_3$ received at the second switch input port 102B. It is desired to switch the wavelength channel $\lambda_3$ to the first switch output port 112A for onward transmission on the first output optical fiber 20A and switch the wavelength channel $\lambda_1$ to the second switch output port 112B for onward transmission on the second output optical fiber 20B.

Adopting the notation of FIG. 7, for the embodiment illustrated in FIG. 4(a):

$N=3[\lambda_1,\lambda_2,\lambda_3]$ $f_2(1)=1$ [$\lambda_1$ to the second switch output port 112B]
$f_2(2)=1$ [$\lambda_3$ to the first switch output port 112A]
$n(1)=1$ [$\lambda_1$]; $n_1(1)=0$ and $n_2(1)=1$ [$\lambda_1$]
$n(2)=2$ [$\lambda_2,\lambda_3$]; $n_1(2)=1$ [$\lambda_1$] and $n_2(2)=0$ With reference to FIGS. 4(a) and 7 of the drawings, and initially considering the optical signals received at the first switch input port 102A:

The optical signals received at the first switch input port 102A are destined for the second switch output port 112B only ($f_2(1)=1$) and hence no splitting of the optical signals is required.

It is desired to switch $n_2(1)=1$ wavelength channel to the second switch output port 112B. Since the optical signals received at the first switch input port 102A comprise $n(1)=1$ wavelength channel, no blocking of wavelength channels is required.

The second switch output port 112B defines a destination for optical signals from the first switch input port 102A only. Accordingly, the optical signals from the first switch input port 102A are directly switched to the second switch output port 112B.

The flow diagram of FIG. 7 is repeated for the second switch input port 102B:

The optical signals received at the second switch input port 102B are destined for the first switch output port 112A only ($f_2(2)=1$) and hence no splitting of the optical signals is required.

It is desired to switch $n_1(2)=1$ wavelength channel to the first switch output port 112A. Since the optical signals received at the second switch input port 102B comprise n(2)=2 wavelength channels, these optical signals must be switched to the wavelength blocker 106A configured to block the wavelength channel $\lambda_2$. Accordingly, the optical signals output at the wavelength blocker 106A comprise only the wavelength channel $\lambda_1$.

The first switch output port 112A defines a destination for optical signals from the second switch input port 102B only. Accordingly, the optical signals from the wavelength blocker 106A are directly switched to the first switch output port 112B.

It is envisaged that reconfiguration of the ROADM 100 between the configuration illustrated in FIG. 4(a) and the configuration illustrated in FIG. 4(b) will be effected by a control plane function having control of the network as a whole.

Figure 5:
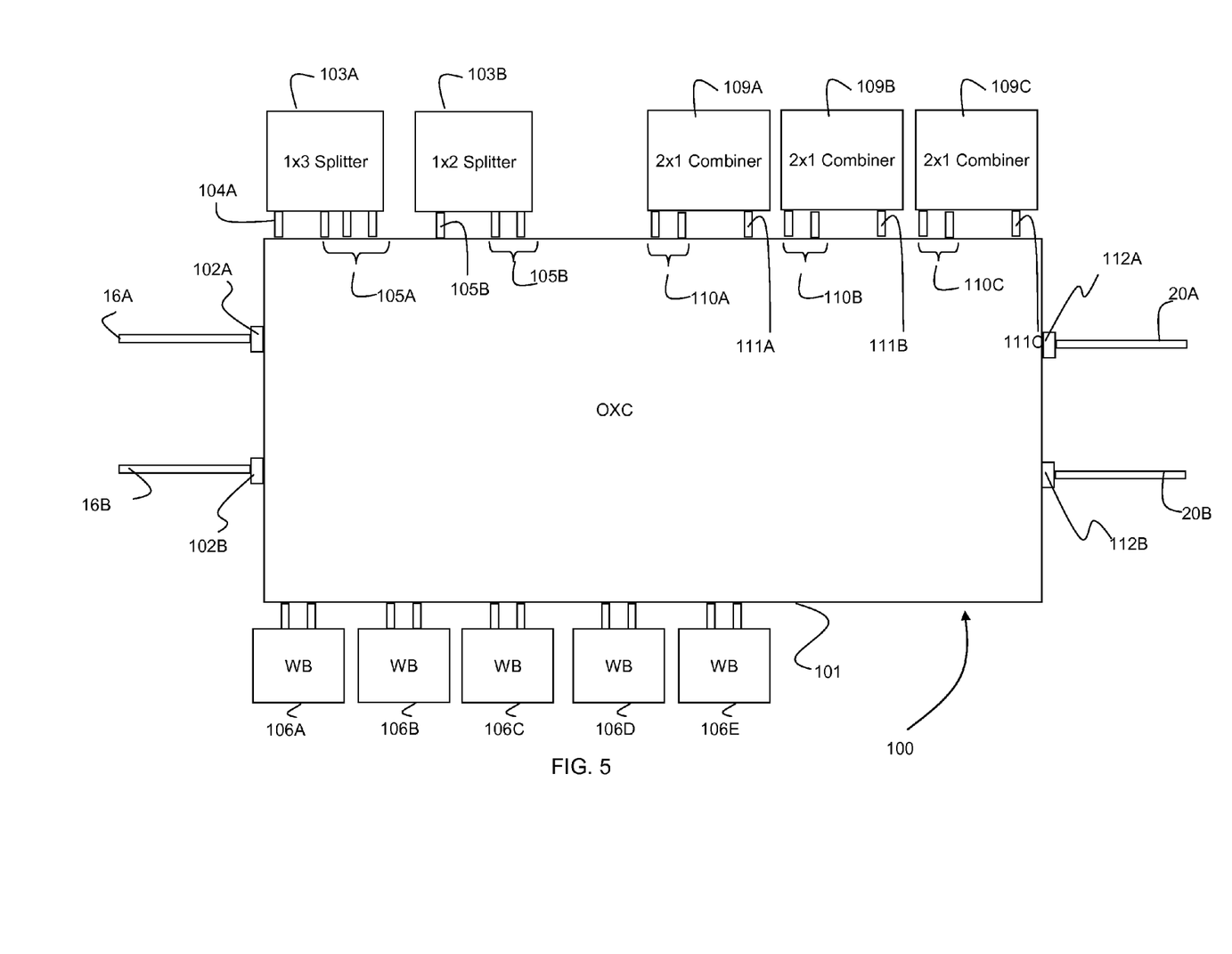
FIG. 5 shows an apparatus for switching optical signals in accordance with an alternative embodiment.
Figure 6:
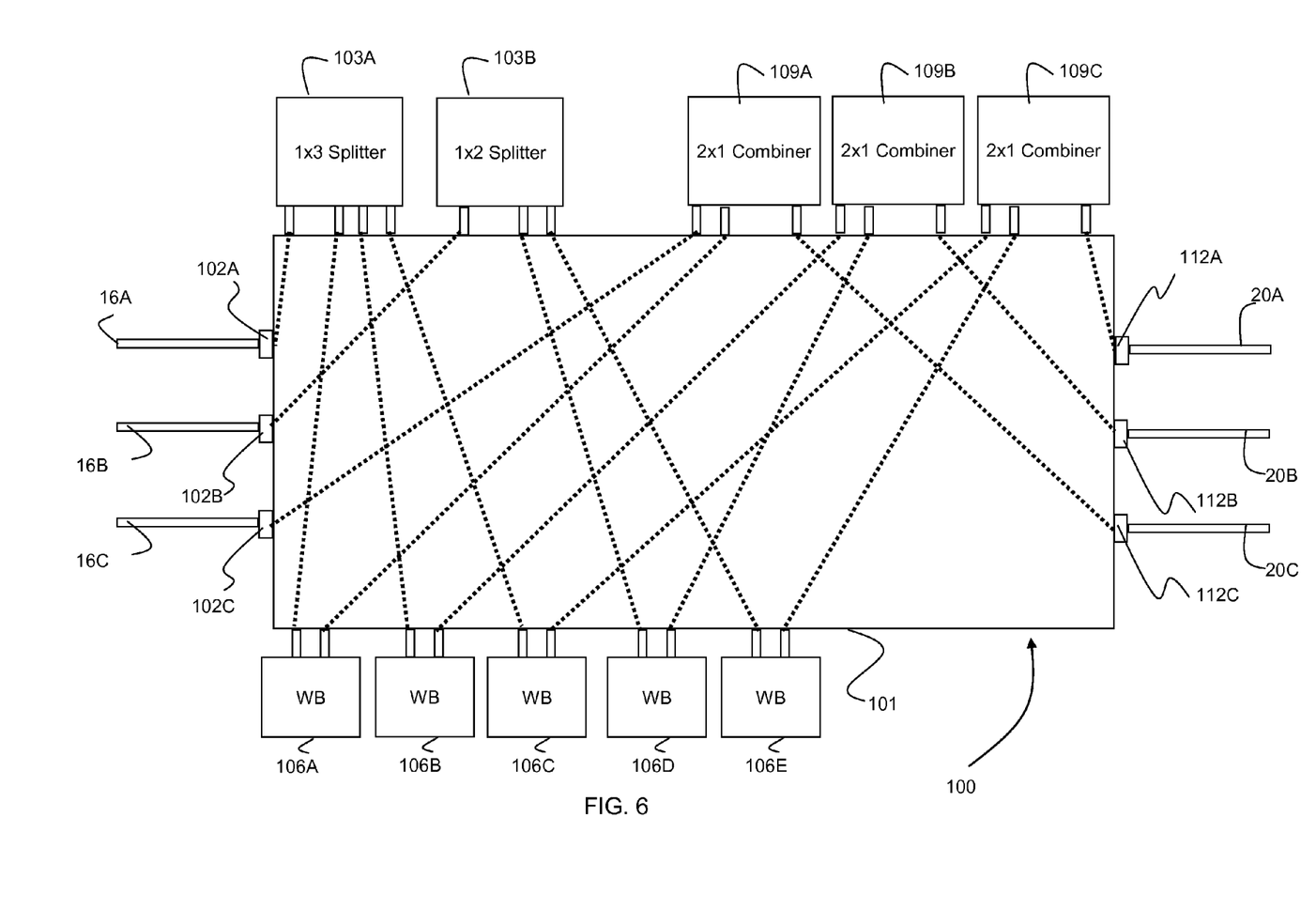
FIG. 6 shows an example optical coupling configuration of the apparatus of FIG. 5.

FIGS. 5 and 6 illustrate an alternative ROADM 200 in accordance with an alternative embodiment. For ease of reference, like parts have been given like reference numerals. The ROADM 200 is similar to the ROADM 100 illustrated in FIGS. 3 and 4 but comprises three switch input ports 102 and three switch output ports 112 as opposed to the two switch input ports 102 and two switch output ports of the embodiment illustrated in FIGS. 3 and 4. In addition, the ROADM 200 shown in FIGS. 5 and 6 comprises two passive optical splitters 103, one of which is a 1×3 optical splitter 103A and one of which is a 1×2 optical splitter 103B. The ROADM 200 further comprises five wavelength blockers 106 and three passive 2×1 optical combiners 109.

FIG. 6 shows an example configuration of the ROADM 200 illustrated in FIG. 5. The configuration illustrated in FIG. 6 switches at least one wavelength channel received at the first switch input port 102A to each of the three switch output ports 112A, 112B, 112C. In addition, the configuration switches at least one wavelength channel received at the second switch input port 102B to the first and second switch output ports 112A, 112B. Finally, the illustrated configuration switches the wavelength channel(s) received at the third switch input port 102A to the third switch output port 112C.

Alternatives and Modifications

Whilst the apparatus has been described in relation to a ROADM of an optical node, it will be appreciated that it is not limited to this application; it is suitable for switching optical signals at any point within a network comprising optical data transmission.

In the illustrated embodiments, the outputs of the optical splitters are switched directly to wavelength blockers, optical combiners or switch output ports. In an alternative embodiment, one or more outputs of optical splitters may be switched to inputs of respective other optical splitters, thereby enabling so-called cascading of optical splitters.

In the illustrated embodiments, the outputs of the wavelength blockers are switched directly to optical combiners or switch output ports. In an alternative embodiment, the output of one or more wavelength blockers may be switched to inputs of respective other wavelength blockers in order to block additional wavelength channels.

In the illustrated embodiment, the optical signals are switched to the optical splitters prior to being switched to respective wavelength blockers. In an alternative embodiment, the optical signals may be switched to one or more wavelength blockers prior to being switched to an optical splitter. This embodiment may be appropriate if certain wavelength channels are not desired at any of the switch output ports associated with the respective splitter output ports.

In the illustrated embodiment, the optical signals are switched to the wavelength blockers prior to being switched to the optical combiners. In an alternative embodiment, the optical signals may be switched to the optical combiners prior to being switched to one or more wavelength blockers. This embodiment may be appropriate if optical signals from more than one switch input port each comprise the same undesired wavelength channels.

The invention claimed is:

1. An apparatus for switching optical signals, the apparatus being configured to handle optical signals comprising up to N independent wavelength channels, the apparatus comprising:
a controllable all optical matrix switch comprising $F_1$ switch input ports, $F_2$ switch output ports and switch ports connected to one or more optical splitters, to two or more wavelength blockers and to one or more optical combiners; and optical signals
means configured:
(a) to detect, in use, each input optical fiber carrying optical signals destined for more than one output optical fiber, and for each such optical fiber to control the switch either
(a1) to switch the optical signals from the respective switch input port to an input port of a respective one of the optical splitters, and to switch the optical signals output by splitter output ports of the optical splitter to respective switch output ports, either directly, or indirectly in accordance with (a2) and (b), and
(a2) where the optical signals comprise n wavelength channels of which $n_p$<n are destined for a given output optical fiber, to switch the optical signals to a wavelength blocker configured to permit said $n_p$ wavelength channels to pass to said given output optical fiber and block respective others of said n wavelength channels,
or
(a3) where the optical signals comprise n wavelength channels of which $n_p$<n are destined for a given output optical fiber, to switch the optical signals from the respective switch input port to a wavelength blocker configured to permit said $n_p$ wavelength channels to pass to said given output optical fiber and block respective others of said n wavelength channels, and
(a4) to switch the passed wavelength channels to a respective one of the optical splitters, and to switch the optical signals output by splitter output ports of the optical splitter to respective switch output ports, either directly, or indirectly in accordance with (b); and
(b) to detect, in use, each output optical fiber defining a destination for optical signals from at least two input optical fibers, and for each such optical fiber to control the switch to switch the optical signals to the respective output port via an optical combiner, the optical combiner being arranged to receive inputs from said at least two input optical fibers.

2. An apparatus according to claim 1, wherein said means comprises a processor for controlling the switch and arranged to execute a control plane function having overall network control, the apparatus being a slave to the control plane function.

3. An optical network for carrying optical data signals, comprising at least one apparatus according to claim 1.

4. A method for switching optical signals from $F_1$ input optical fibers to $F_2$ output optical fibers, the optical signals received via the $F_1$ input optical fibers together comprising N independent wavelength channels, the method comprising:

(a) providing an optical matrix switch comprising $F_1$ switch input ports and $F_2$ switch output ports;

(b) connecting the $F_1$ input optical fibers to respective $F_1$ switch input ports and the $F_2$ output optical fibers to respective $F_2$ switch output ports;

(c) connecting to respective ports of the optical matrix switch; one or more optical splitters two or more wavelength blockers and one or more optical combiners; and, (d) for each input optical fiber carrying optical signals destined for more than one output optical fiber, either (d1) switching the optical signals from the respective switch input port to an input port of a respective one of the optical splitters, and switching the optical signals output by splitter output ports of the optical splitter to respective switch output ports, either directly, or indirectly in accordance with (d2) and (e), and (d2) where the optical signals comprise n wavelength channels of which $n_p$<n are destined for a given output optical fiber, switching the optical signals to a wavelength blocker configured to permit said $n_p$ wavelength channels to pass to said given output optical fiber and block respective others of said n wavelength channels, or (d3) where the optical signals comprise n wavelength channels of which $n_p$<n are destined for a given output optical fiber, switching the optical signals from the respective switch input port to a wavelength blocker configured to permit said $n_p$ wavelength channels to pass to said given output optical fiber and block respective others of said n wavelength channels, and (d4) switching the passed wavelength channels to a respective one of the optical splitters (103), and switching the optical signals output by splitter output ports (105) of the optical splitter (103) to respective switch output ports (112), either directly, or indirectly in accordance with (e); and (e) for optical signals destined for an output optical fiber that defines a destination for optical signals from at least two input optical fibers, switching the optical signals to the respective output port via an optical combiner, the optical combiner being arranged to receive inputs from said at least two input optical fibers.

* * * * *